(12) United States Patent
Schulz

(10) Patent No.: US 6,596,542 B1
(45) Date of Patent: Jul. 22, 2003

(54) FLOW-THROUGH CHEMICAL ACTINOMETER FOR ULTRAVIOLET DISINFECTION REACTORS

(76) Inventor: Christopher R. Schulz, 2795 E. Fair Pl., Aurora, CO (US) 80016

( * ) Notice: Subject to any disclaimer, the term of this patent is extended or adjusted under 35 U.S.C. 154(b) by 144 days.

(21) Appl. No.: 09/756,371

(22) Filed: Jan. 8, 2001

(51) Int. Cl.$^7$ .............................. A61L 2/10; G01N 21/62
(52) U.S. Cl. ................... 436/1; 436/164; 422/82.05; 422/24; 250/372; 250/474.1
(58) Field of Search .................. 422/82.05, 24.83, 422/105, 114; 436/1, 164, 43, 50, 55; 250/372, 474.1

(56) References Cited

U.S. PATENT DOCUMENTS

| | | | |
|---|---|---|---|
| 4,763,011 A | 8/1988 | Smith | 250/372 |
| 5,036,311 A | 7/1991 | Moran et al. | 340/600 |
| 5,500,532 A | 3/1996 | Koziki | 250/372 |
| 6,183,695 B1 * | 2/2001 | Godec et al. | 422/76 |

OTHER PUBLICATIONS

Technical Note, entitled, "Potassium Iodide as a chemical Actinometer for 254nm Radiation: Use of Iodate as an Electron Scavenger," by Ronald O. Rahn, Photochemistry and Photobiology, 1997, 66(4), pp. 450–455.

* cited by examiner

Primary Examiner—Lyle A. Alexander
(74) Attorney, Agent, or Firm—Alfred J. Mangels

(57) ABSTRACT

A chemical actinometer for determining the absolute level of exposure to ultraviolet light of a fluid to be treated for disinfection purposes. The actinometer includes a translucent sample cell through which the chemical actinometric fluid flows. The area of exposure of the actinometric fluid is controlled by allowing the ultraviolet light to pass through only a portion of the sample cell. A suitable actinometric fluid is a combination of iodide and iodate in a solution. The sample cell is positioned within an ultraviolet disinfection reactor at a position to receive ultraviolet light from the ultraviolet light source.

22 Claims, 3 Drawing Sheets

FLOW-THROUGH CHEMICAL ACTINOMETER FOR ULTRAVIOLET DISINFECTION REACTORS

BACKGROUND OF THE INVENTION

1. Field of the Invention

The present invention relates to apparatus for accurately determining the level of exposure to ultraviolet light of a liquid that flows through a passageway within which ultraviolet light sources are disposed. More particularly, the present invention relates to a chemical actinometer for determining the absolute ultraviolet light dose that is directed to water flowing through a disinfection reactor, for monitoring the effectiveness of the disinfection process.

2. Description of the Related Art

Water disinfection reactors having ultraviolet light sources disposed within the passageways through which the water to be disinfected flows have been known for some time. The ultraviolet light deactivates pathogenic microorganisms without producing residuals or hazardous byproducts, and it avoids the need to use hazardous disinfection chemicals.

Generally, the output of ultraviolet lamps utilized in disinfection reactors diminishes gradually over time. Such diminution results from aging of the lamps and also from blockage of the light by deposits on the surfaces of the lamp housings. The deposits are typically dissolved minerals in the water that adhere to the surfaces of the quartz tubes or sleeves within which the ultraviolet lamps are usually housed, and the deposits either physically block the light path or they absorb ultraviolet light. As a consequence, the effectiveness of the disinfection process must be monitored by periodically determining the amount of ultraviolet light that actually passes through the water being treated.

Typically, ultraviolet-light-based disinfection reactors are equipped with photocells that are sensitive to ultraviolet light. The photocells measure relative changes in the ultraviolet fluence rate (or irradiance) within the flowing water. Changes in ultraviolet irradiance patterns in the reactor because of lamp aging, buildup of light-blocking deposits on the surfaces of the quartz sleeves, or changes in the ultraviolet transmittance of the fluid being irradiated, can be sensed by the photocells. But the photocells only indicate relative values of ultraviolet light irradiance, and they cannot be used to determine the absolute value of ultraviolet light irradiance to which the fluid is subjected. Consequently, the photocells can only provide an indication of a decrease in the ultraviolet irradiance output, but they cannot be used to directly determine the ultraviolet dose, which is expressed as the product of irradiance in $mW/cm^2$ and time in seconds, to demonstrate compliance with disinfection requirements.

In addition to their inability to directly determine the ultraviolet dose to which the water to be treated is exposed, the sensitivity of photocells decreases with use. Such decreases are caused by surface damage from ultraviolet light radiation and also by aging of the photocells. Accordingly, recalibration of the photocells is required at regular intervals, to assure that they can be relied upon to accurately monitor the changes in the irradiance output from the ultraviolet light sources. Those same limitations apply to other forms of physical detectors, such as thermopiles, joulemeters, photodiodes, and the like.

Another limitation of most light detectors that are based upon physically measuring the ultraviolet light is that they are typically mounted on the wall of the reactor vessel and can only measure incident ultraviolet light from a single direction. Thus, in reactors within which some of the ultraviolet light is reflected from the reactor walls, in addition to the light that passes directly from the light source to the detector, the effects of such reflected light are not accurately detected and indicated by the physical detectors.

It is therefore an object of the present invention to provide an actinometer-based ultraviolet monitor that can measure the actual exposure of a flowing liquid to ultraviolet light in an ultraviolet light reactor vessel, and to overcome the deficiencies and limitations of the previously-used devices.

SUMMARY OF THE INVENTION

Briefly stated, in accordance with one aspect of the present invention, a flow-through chemical actinometer system is provided for monitoring ultraviolet light radiation. The actinometer system includes a source vessel containing an actinometric solution that is responsive to ultraviolet light in a germicidal treatment range. A collection vessel is provided for receiving the actinometric solution after it has been exposed to ultraviolet light. Extending from the source vessel to the collection vessel is a flow conduit that passes through an ultraviolet reactor vessel and includes at least one sample cell having a transparent section through which the actinometric solution flows for exposure to ultraviolet light. A pump conveys the actinometric solution from the source vessel, through the conduit, to the collection vessel.

In accordance with another aspect of the present invention, a method is provided for assessing the ultraviolet light dose to which a liquid containing microorganisms is exposed while flowing through a reactor containing an ultraviolet light source for inactivating the microorganisms. The method includes providing an actinometric chemical solution that is reactive to ultraviolet light in a germicidal treatment wavelength range. The actinometric solution is passed through an opaque conduit that extends into the ultraviolet reactor and that includes a sample cell having a predetermined area of transparency to expose the actinometric solution to ultraviolet light within the reactor. The exposed actinometric solution is analyzed for chemical changes and the ultraviolet light dose to which the liquid to be treated has been exposed within the reactor is determined based upon the analyzed chemical changes.

DESCRIPTION OF THE PREFERRED EMBODIMENTS

Figure 1:
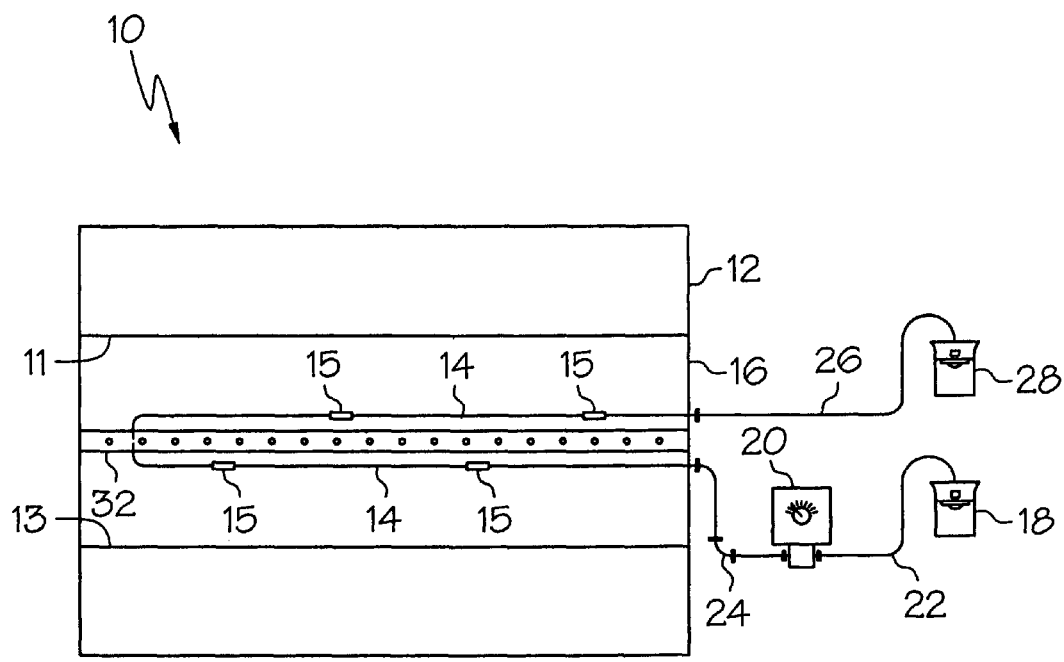
FIG. 1 is a diagrammatic view of one form of chemical actinometer system in accordance with the present invention.

Referring to the drawings, and particularly to FIG. 1 thereof, there is shown diagrammatically one form of a chemical actinometer system 10 in accordance with the present invention. The fluid that is to be treated by exposure to ultraviolet light passes through an ultraviolet-light-based disinfection reactor vessel 12, which can be an elongated vessel that defines a reactor chamber that can have any convenient cross-sectional form. Reactor vessel 12 as shown in FIG. 1 in transverse cross section has a generally rectangular form in cross section with convex top and bottom walls 11 and 13 that define a converging-diverging flow passageway. The direction of flow of the fluid to be treated in reactor 12 of FIG. 1 is perpendicular to the plane of the paper.

At least one ultraviolet lamp (not shown in FIG. 1) is positioned within reactor vessel 12 to expose the flowing fluid to ultraviolet light. The lamp can be a tubular lamp that is positioned transversely relative to the direction of flow of the fluid to be treated, or it can be positioned so that its longitudinal axis is substantially aligned with the direction of fluid flow. If more than one lamp is provided, the lamps are generally in spaced relationship with each other and with the sidewalls of reactor vessel 12.

Extending into the interior of reactor vessel 12 is a U-shaped sample conduit 14 within which an ultraviolet-sensitive sample fluid flows. One or more quartz sample cells 15 are provided at spaced intervals along conduit 14 to allow controlled exposure of the sample fluid to ultraviolet irradiance. Conduit 14 can have an outer diameter of the order of about ⅛ inch, and it is opaque so that sample fluid passing through conduit 14 is not exposed to any light waves except when the fluid passes through a sample cell. Preferably, conduit 14 is rigid stainless steel, to withstand the forces of flows passing through the reactor and avoid the deterioration that other materials can experience when subjected to ultraviolet light over extended periods of time. As shown in FIG. 1, conduit 14 extends across substantially the entire flow path of the fluid to be treated, and passes outwardly from reactor vessel 12 though sidewall 16. However, the length of the conduit and the positions along the conduit of the one or more sample cells can be changed depending upon the structural arrangement of the reactor and the light sources.

The chemical test solution for assessing the intensity of the ultraviolet light that passes into the fluid to be treated is placed in a suitable container 18, such as a beaker as shown. A variable speed, positive displacement pump 20, such as, for example, a peristaltic pump or a gear pump, draws the chemical solution from container 18 through a suction conduit 22, which can be in the form of flexible tubing, if desired. Preferably pump 20 is operated through a variable speed drive (not shown) so that the solution feed rate can be adjusted to allow the evaluation of different solution residence times, and consequently different ultraviolet exposure times, in the sampling system. The solution is pumped through pump discharge conduit 24, which is connected with an end of U-shaped sample conduit 14 that extends outwardly of reactor vessel 12, and into a sample cell 15 that is transparent to ultraviolet light. Sample cell 15 is made of quartz glass, which is a transparent material capable of transmitting ultraviolet light with little or no absorbance.

As the test solution flows through sample cell 15 it is exposed to the ultraviolet light emitted by the lamps within the reactor vessel and undergoes a chemical change as a result of that exposure. The exposed fluid then exits from vessel 12 through outlet conduit 26, and into a suitable collection vessel 28, which can be a beaker as shown. The exposed solution is then analyzed, and based upon the levels of certain chemical constituents within the exposed test solution and the time of exposure, the ultraviolet light dose applies to the fluid flowing through reactor vessel 12 can be determined. The total exposure volume within the sample cells and the flow rate of the pump can simulate the average exposure time for the fluid passing through the reactor vessel for disinfection treatment. Although a single sample cell can provide an indication of the exposure level of the fluid to be treated, placing multiple cells at strategic points within the reactor permits a more precise determination of the actual ultraviolet dose to which the fluid to be treated is subjected.

The chemical solution can be a potassium iodide/iodate solution, which is especially useful for measuring ultraviolet light doses in the germicidal treatment light band, which extends from a wavelength of from about 200 nm to about 300 nm. However, other actinometer chemical solutions can also be employed, if desired. A suitable sample solution that is reactive to ultraviolet light in the germicidal treatment range is 0.6 M iodide and 0.1 M iodate in 0.01 M borate buffer (pH 9.25), and can be prepared in accordance with information disclosed in a technical note entitled, "Potassium Iodide as a Chemical Actinometer for 254 nm Radiation: Use of Iodate as an Electron Scavenger," by Ronald O. Rahn, which was published in *Photochemistry and Photobiology*, 66, 450–455 (1997), the entire text of which is hereby incorporated herein by reference to the same extent as if fully rewritten. The difference between the absorbance of the solution before exposure to ultraviolet light and after exposure, as measured by a spectrophotometer, can be utilized to determine the incidence fluence (in $Mj/cm^2$) in accordance with the methods and equations provided in the Rahn technical note.

Figure 2:
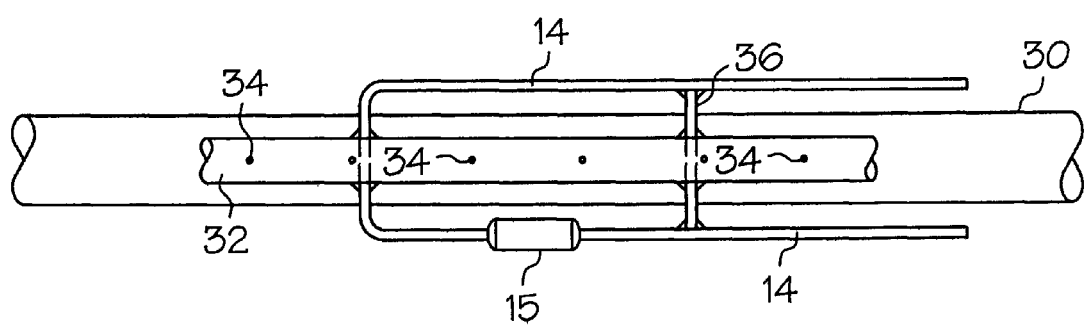
FIG. 2 is an enlarged side view of a portion of the actinometer system shown in FIG. 1.

FIG. 2 shows in enlarged form the leftmost portion of the sample conduit illustrated in FIG. 1. A tubular ultraviolet lamp 30 extends across reactor vessel 12 so that the longitudinal axis of lamp 30 is substantially perpendicular to the direction of flow within reactor vessel 12 of the fluid to be treated. Lamp 30 is advantageously carried within a tubular quartz sleeve (not shown), and chemical cleaning of deposits and other debris from the outer surface of the sleeve can be effected by a tubular cleaning solution distributor 32 having a plurality of axially-spaced apertures 34 to emit a cleaning solution during a cleaning phase of the operation. In the arrangement shown in FIG. 2, the cleaning solution is discharged through apertures 34 in both upstream and downstream directions, relative to the direction of flow of the fluid to be treated, so that it impinges on the outer surface of the tubular sleeves located on either side of distributor 32 and within which the ultraviolet lamps are carried.

Cleaning distributor 32 can also serve to support sample conduit 14. As shown in FIG. 2, one or more support members 36 is suitably secured to distributor 32, such as by welding, or the like. The outermost ends of support member 36 are secured to sample conduit 14, again by welding, or the like, to maintain conduit 14 and sample cells 15 in a desired spatial relationship with ultraviolet lamp 30.

Figure 3:
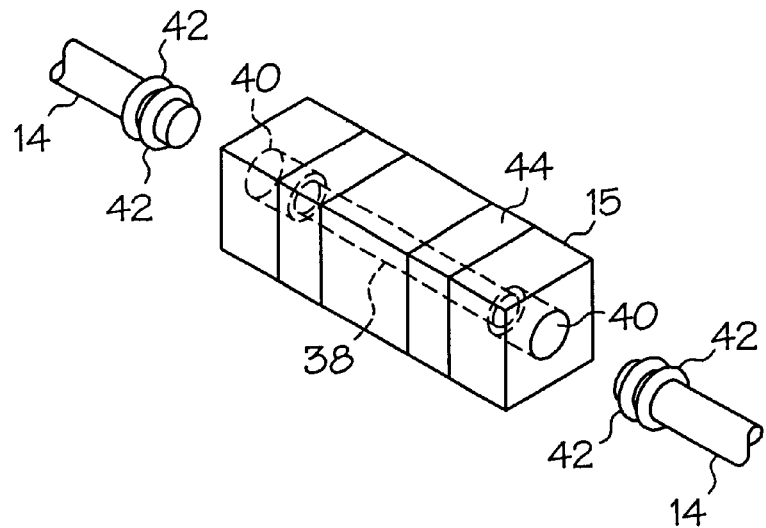
FIG. 3 is an enlarged, fragmentary, perspective view of a quartz sample cell and tubing connections for the system shown in FIG. 1.
Figure 4:
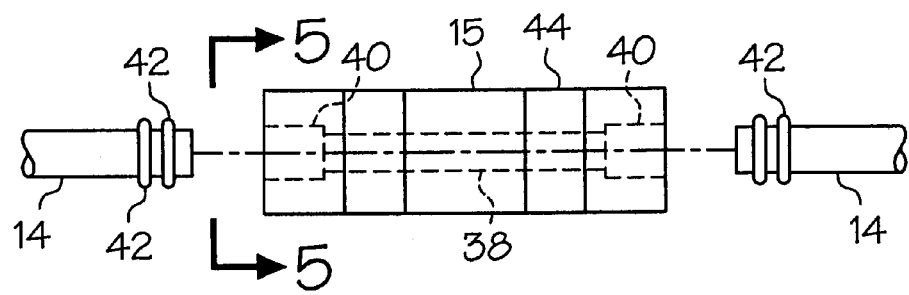
FIG. 4 is a side elevational view of the quartz sample cell shown in FIG. 3.
Figure 5:
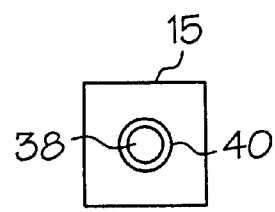
FIG. 5 is an end view of the quartz sample cell shown in FIG. 4 and taken along the line 5—5 thereof.

Sample cell 15 is made from a material that transmits light, such as quartz, so that the sample solution within the cell is exposed to the ultraviolet light as the solution flows through sample conduit 14 and through cell 15. One form in which cell 15 can be provided is shown in FIGS. 3 through 5. As there shown, cell 15 is in the form of a solid block of translucent material and has an length that is greater than either of the width or height. Cell 15 as shown is of rectangular cross section, and it includes a substantially axial flow passageway 38 that extends therethrough in the longitudinal direction and coaxial with the longitudinal axis of cell 15. Passageway 38 can be of circular cross section and can be counterbored at its outermost ends 40 to enable it to receive sections of sample conduit 14. The counterbores can also be tapered, if desired, to improve the flow distribution of the sample solution across the inlet and outlet of the sample cell. Preferably, one or more O-rings 42 are carried in peripheral annular grooves (not shown) at the ends of conduit 14 to provide a fluid-tight seal between sample conduit 14 and sample cell 15. As will be appreciated by those skilled in the art, other fluid-tight connection arrangements between sample conduit 14 and sample cell 15 can be utilized, if desired.

Cell 15 can have any desired axial length. The length of flow passageway 38 that is exposed to the ultraviolet light can be fixed at a desired length, such as, for example, 1 cm, by winding around the exterior of sample cell 15 at suitable spaced intervals a light-blocking material 44, such as an aluminum foil reflective tape, or the like. The longitudinal length of the exposed outer surface of cell 15 and the flow velocity of the sample solution as it flows through sample cell 15 will determine the exposure time of the sample solution to the ultraviolet light. Sample cell 15 is preferably so oriented that light from the ultraviolet lamp passes through the cell wall at a right angle to the outer surface of the cell, to minimize reflectance losses at the quartz/water interface. The desired length of the exposed, transparent portion of sample cell 15 is based upon the desired exposure time to the ultraviolet light, which is typically substantially the same exposure time as that of the liquid flowing through reactor vessel 12 for treatment.

Although shown as having a generally rectangular form, sample cell 15 can be provided in other forms, if desired. For example, the cell can be a tubular transparent structure, such as a quartz tube, that has a cylindrical outer surface and a flow passageway having a circular cross section. Alternatively, the cell can be of triangular form, or some other polygonal form, such as hexagonal, if desired, as long as the cell is transparent to ultraviolet radiation and can be suitably configured to provide the desired area to permit the desired time of exposure of the sample solution to the ultraviolet light.

Figure 6:
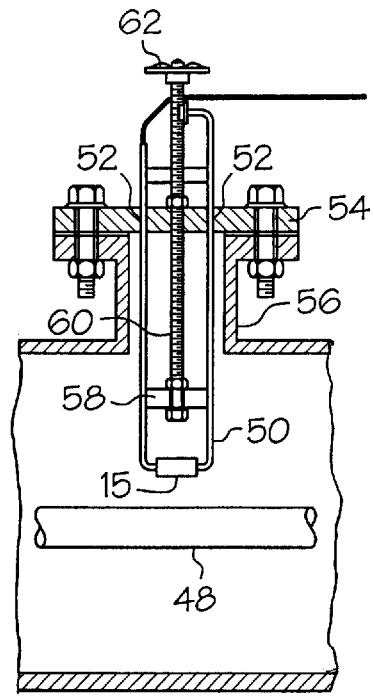
FIG. 6 is a longitudinal cross-sectional view through another embodiment of a chemical actinometer system, in which the distance of a quartz sample cell from the light source is adjustable.
Figure 7:
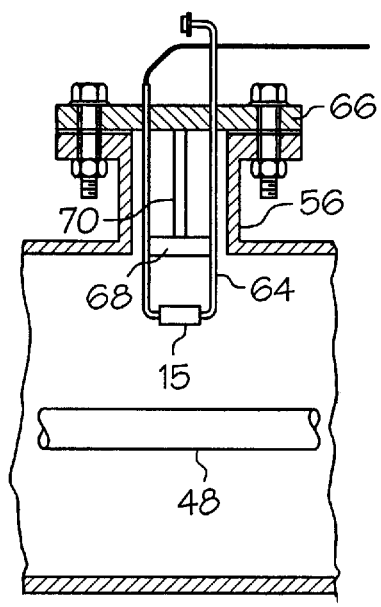
FIG. 7 is a longitudinal cross-sectional view through a further embodiment of a chemical actinometer system, in which the distance of a quartz sample cell is fixed relative to the light source.

Alternative orientations of sample cell 15 relative to the reactor vessel wall are shown in FIGS. 6 and 7, in which a single sample cell is provided and is spaced from the light source in a transverse direction, relative to the direction of flow of the fluid to be treated. FIG. 6 shows a sample system in which the spacing of sample cell 15 from an ultraviolet light source 48 can be changed. A U-shaped, stainless steel sample conduit 50 that includes sample cell 15 is slidably received in ultraviolet-resistant PTFE sleeves 52 that are carried in openings in a flange 54 through which the legs of the U-shaped sample conduit pass. Flange 54 is bolted to a flanged collar 56 that extends from a wall of the reactor vessel. A cross member 58 extends between and is rigidly connected with the legs of sample conduit 50, and it rotatably receives an adjusting screw 60 that is threadedly carried by flange 54. The outermost end of adjusting screw 60 can include a hand wheel 62, or the like, to allow the position of sample cell 15 relative to lamp 48 to be changed.

In FIG. 7, there is shown an arrangement that is similar to that of FIG. 6, except that sample cell 15 is fixed in position relative to the reactor vessel wall and relative to lamp 48. U-shaped sample conduit 64 has legs that are secured to flange 66, such as by welding, to fix the position of sample cell 15 at the desired position within the reactor vessel. The legs of sample conduit 64 are braced by a cross member 68, that is, in turn, connected with a support member 70 that is secured to the inner face of flange 66.

The operation of the sample cell system herein described includes initially measuring the absorbance of the test solution prior to irradiation. The measurements are performed at 300 nm and at 352 nm using a spectrophotometer. The reading at 300 nm is used to obtain the concentration of the iodide in a potassium iodide-iodate solution, as is described in the Rahn technical note hereinbefore identified.

After the initial absorbance of the test solution has been determined, and before the test solution is introduced into the test system, the pump is operated to rinse the tubing system at a high flow rate with at least two flushing volumes of distilled water. After rinsing, the pump speed is adjusted to provide the desired flow rate of sample fluid through the sample system, as determined by a fixed volume sample and a stopwatch. The potassium iodide-iodate test solution is poured into the supply beaker and the pump suction tube is placed into the solution. The test solution is pumped through the sample conduit and through the sample cell at a constant rate. The initial flows emanating from the outlet of the sample conduit are discarded and a sample is collected after an amount aggregating about 150% of the interior volume of the sample conduit and the sample cell has passed through the system.

The sample that is collected is placed in a spectrophotometer and the increase in absorbance of the sample at 352 nm is measured. The quantum yield of the solution, the concentration of triiodide, the total number of moles of product formed, the number of photons absorbed by the sample, and the incidence fluence (in $mJ/cm^2$) can be calculated by the equations provided in the Rahn technical note hereinbefore identified.

The actinometer can also be utilized to periodically monitor disinfection compliance during operation of a particular ultraviolet reactor in a water treatment system. In that regard, tests can be run in which the ultraviolet light dose is varied for several flow rates of the water to be treated and for which the organism incidence levels are known, in order to determine empirically the relationship between a range of reactor-specific doses of ultraviolet light and the resulting disinfection performance for a range of water flow rates and for known organism incidence levels. After treatment, the disinfection efficiency can be determined by assessing the degree of inactivation of the organisms for the several light levels and throughput rates for the water to be treated by determining the log inactivation of target organisms across the reactor. When sufficient data are available for a variety of operating conditions, one or more reactor-specific, dose-response curves can be developed that will enable the disinfection efficiency to be determined directly by monitoring the ultraviolet light output during normal operation of the reactor by periodically operating the actinometer herein described. Having such curves will eliminate the need to use a collimated beam approach for developing indirect dose-response curves to monitor disinfection compliance.

Although particular embodiments of the present invention have been illustrated and described, it will be apparent to those skilled in the art that changes and modifications can be made without departing from the spirit of the present invention. Accordingly, it is intended to encompass within the appended claims all such changes and modifications that fall with the scope of the present invention.

What is claimed is:

1. A flow-through chemical actinometer system for monitoring ultraviolet light radiation dosage to which a fluid flowing within an ultraviolet reactor vessel is exposed for disinfection by exposure to ultraviolet light, said actinometer system comprising:
   a. a source vessel containing an actinometric chemical solution that is reactive to ultraviolet light in a germicidal treatment range;
   b. a collection vessel for receiving the actinometric solution after it has been exposed to ultraviolet light;
   c. a flow conduit extending from the source vessel, through the ultraviolet reactor vessel, to the collection vessel, the flow conduit including at least one sample cell positioned within the ultraviolet reactor vessel and through which the actinometric solution flows, the at least one sample cell having a transparent section to allow exposure of the actinometric solution to ultraviolet light that has passed through the fluid to be disinfected;
   d. an ultraviolet light source that is spaced from the at least one sample cell to define a flow passageway between the light source and the at least one sample cell, and through which passageway fluid to be disinfected flows between the light source and the sample cell to be exposed to ultraviolet light;
   e. means for conveying the actinometric solution from the source vessel, through the conduit, through the at least one sample cell, to the collection vessel; and
   f. means for measuring absorbance of the actinometric solution before and after passage through the at least one sample cell to monitor the ultraviolet radiation dosage to which fluid to be disinfected and that flows through the reactor vessel has been subjected.

2. A chemical actinometer system in accordance with claim 1, wherein the actinometric solution is a solution that is about 0.6 M iodide and about 0.1 M iodate in 0.01 M borate buffer.

3. A chemical actinometer system in accordance with claim 1, including a variable speed drive for driving the pump.

4. A chemical actinometer system in accordance with claim 1, wherein the at least one sample cell is a quartz cell that includes a flow passageway that extends through the cell, and wherein the cell has a predetermined transparent area that allows the passage therethrough of ultraviolet light.

5. A chemical actinometer system in accordance with claim 1, wherein the at least one sample cell has a rectangular cross section.

6. A chemical actinometer system in accordance with claim 5, wherein the at least one sample cell has a flow passageway extending therethrough to allow exposure of actinometric solution to ultraviolet light, and wherein the flow passageway has a substantially circular cross section.

7. A chemical actinometer system in accordance with claim 1, wherein the flow conduit includes a plurality of spaced sample cells.

8. A chemical actinometer system in accordance with claim 1, wherein the reactor vessel includes an interiorly-positioned source of ultraviolet light and receives a flowing stream of fluid to be treated by exposure to light emitted by the light source, wherein the actinometer flow conduit extends through a sidewall of the reactor vessel and into the flowing stream of fluid to be treated.

9. A chemical actinometer system in accordance with claim 8, wherein the at least one sample cell is fixed in position relative to the reactor vessel sidewall.

10. A chemical actinometer system in accordance with claim 8, wherein the at least one sample cell is movable toward and away from the reactor vessel sidewall.

11. A chemical actinometer system in accordance with claim 10, wherein the flow conduit includes a U-shaped portion having a pair of substantially parallel legs, wherein the legs are slidably received in the reactor vessel sidewall to enable the adjustment of the position of the at least one sample cell relative to a ultraviolet light source.

12. A chemical actinometer system in accordance with claim 11, including a threaded rod rotatably supported by the reactor vessel sidewall, and a handle on an outermost end of the threaded rod for rotating the rod about its axis and shifting the at least one sample cell toward and away from the reactor vessel sidewall.

13. A chemical actinometer system in accordance with claim 8, including a cleaning material distributor positioned within the reactor vessel for injecting a cleaning composition into the reactor vessel to impinge against and to clean deposits from a surface of the ultraviolet light source.

14. A chemical actinometer system in accordance with claim 13, wherein the cleaning material distributor includes a tubular member that extends into the reactor vessel and that includes a plurality of spaced openings to allow a cleaning material to be introduced into a flow stream passing through the reactor.

15. A chemical actinometer in accordance with claim 14, wherein the source of ultraviolet light is of tubular form and the cleaning material distributor is positioned substantially parallel to the ultraviolet light source.

16. A chemical actinometer in accordance with claim 4, wherein the size of the predetermined transparent area of the at least one sample cell can be varied.

17. A chemical actinometer in accordance with claim 16, wherein the size of the predetermined transparent area of the at least one sample cell is defined by a light-blocking material that is removably applied to an outer surface of the at least one sample cell.

18. A method for assessing the ultraviolet light dose to which a liquid containing microorganisms is exposed while flowing through a reactor containing an ultraviolet light source for inactivating the microorganisms, said method comprising the steps of:
   a. providing an actinometric chemical solution that is reactive to ultraviolet light in a germicidal treatment wavelength range;
   b. passing the actinometric solution through an opaque conduit that extends into the ultraviolet reactor and that includes a sample cell having a predetermined area of transparency to expose the actinometric solution to ultraviolet light within the reactor, wherein the exposure time to ultraviolet light of the actinometric solution corresponds substantially with the exposure time to ultraviolet light of the liquid flowing through the reactor;
   c. exposing the actinometric solution to ultraviolet light;
   d. analyzing the exposed actinometric solution for chemical changes; and
   e. determining the ultraviolet light dose to which the liquid to be treated has been exposed within the reactor based upon the analyzed chemical changes.

19. A method in accordance with claim 18, including the step of varying the flow rate of the actinometric solution through the sample cell based upon the flow rate of the liquid to be treated.

20. A method in accordance with claim 18, including the step of varying the spacing between the sample cell and the ultraviolet light source.

21. A method in accordance with claim 18, wherein the analysis of the exposed actinometric solution includes measuring the difference between the absorbance of the actinometric solution before exposure to ultraviolet light and its absorbance after exposure to ultraviolet light.

22. A method in accordance with claim 18, including the steps of: providing an empirically-derived relationship between a range of reactor-specific doses of ultraviolet light and resulting disinfection efficiency for a range of flow rates and for known organism incidence levels, and subsequently assessing operating performance of the reactor by comparing a measured ultraviolet light dose obtained by analysis of the actinometric solution during actual operation of the reactor with the empirically-derived relationship to determine disinfection efficiency.

* * * * *